Patented Dec. 23, 1930

1,786,263

UNITED STATES PATENT OFFICE

WILHELM PUNGS, OF LUDWIGSHAFEN-ON-THE-RHINE, AND MICHAEL JAHRSTORFER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

HARDENING PARAFFIN, WAXES, AND THE LIKE

No Drawing. Application filed December 22, 1927, Serial No. 242,010, and in Germany December 23, 1926.

Solid and semisolid organic substances of low melting point such as the various kinds of paraffin wax, ozokerite and ceresine, in waxes of vegetable and animal origin, in stearin, tallow and the like, all have physical properties similar to those of bees wax i. e. the low melting point, softness and excessive pliability of bees wax and will be therefore, for the sake of brevity, referred to in the specification and in the claims as "materials having physical properties similar to those of bees wax". In view of their physical and chemical properties they would be useful for many industrial purposes, but they can only be used to a restricted extent owing to their soft nature and their low melting point. In order to overcome these difficulties occurring in the industrial application of the said materials having physical properties similar to those of bees wax, they have already been mixed with substances of a higher melting point, but owing to the fact that small amounts of a substance added to another substance lower the melting point of the latter, large additions are necessary in order to raise the melting point of the paraffin, ozokerite and the other abovementioned wax-like substances. By the said large additions, however, the valuable properties of the said substances are impaired or their behaviour is entirely altered so that they cannot be used any more for the purpose they were intended for.

We have now found that the above mentioned organic substances having physical properties similar to those of beeswax, can be hardened to a considerable extent and the melting point of the said substances be remarkably raised by adding thereto small amounts, that is up to 10 per cent of Montan wax bleached with oxidizing agents, such as chromic acid, or by the anodic action of the electric current or other oxidizing means. The manner, in which the oxidation bleached Montan wax can be obtained, is well-known. Some processes are described, for example, in the U. S. Patents 1,690,876, 1,698,450 and 1,699,250 and in the copending applications Ser. No. 254,604, filed February 15, 1928, and Ser. No. 252,037, filed February 4, 1928. Generally speaking, it is already sufficient to add 2 to 4 per cent of the oxidation bleached Montan wax for hardening the said products having physical properties similar to those of beeswax to a considerable extent and to raise the melting points of the said materials as much as 20° C. and even more. By the said small additions the properties of the products having physical properties similar to those of beeswax are not impaired, but on the contrary, the addition of the said Montan wax produces a favorable change in the appearance, feel and the like, of the original substance. Paraffin for example loses its crystalline structure, acquires a compact texture and becomes opaque, a property which is highly desirable for candlemaking, for instance. Beeswax is rendered less sticky and more difficult to knead at hand temperature.

The Montan wax bleached with oxidizing agents has the important advantage of possessing a pale color and therefore being free from the disadvantage of impairing the color of the materials to which it is added.

The accompanying table gives by way of example some details on the increase of the melting points of paraffin, beeswax, tallow and spermaceti:

1. Melting point of paraffin cake 51–52° C. on addition of:

|  | 4% | 8% |
|---|---|---|
| Oxidation bleached Montan wax (mp. 84.5° C.) | 61–62° C. | 72–73° C. |

2. Melting point of beeswax 60–61° C. on addition of:

|  | 2% | 4% | 8% |
|---|---|---|---|
| Oxidation bleached Montan wax (mp. 84.5° C.) | 62° C. | 65° C. | 69° C. |

3. Melting point of beef tallow 48° C. on addition of:

|  | 4% | 8% |
|---|---|---|
| Oxidation bleached Montan wax (mp. 84.5° C.) | 55° C. | 70° C. |

4. Melting point of spermaceti 47–47.5° C. on addition of:

| | 4% | 8% |
|---|---|---|
| Oxidation bleached Montan wax (mp. 84.5° C.) | 48° C. | 61° C. |

We claim:

1. A composition of matter comprising a material having physical properties similar to those of beeswax, and up to 10 per cent by weight thereof of oxidation-bleached Montan wax.

2. A composition of matter comprising a material having physical properties similar to those of beeswax, and from 2 to 4 per cent by weight thereof of oxidation-bleached Montan wax.

3. A composition of matter comprising paraffin wax, and up to 10 per cent by weight thereof of oxidation-bleached Montan wax.

4. A composition of matter comprising paraffin wax, and from 2 to 4 per cent by weight thereof of oxidation-bleached Montan wax.

5. The process of hardening a material having physical properties similar to those of beeswax, which comprises adding thereto up to 10 per cent by weight thereof of oxidation-bleached Montan wax.

6. The process of hardening a material having physical properties similar to those of beeswax, which comprises adding thereto from 2 to 4 per cent by weight thereof of oxidation-bleached Montan wax.

7. The process of hardening paraffin wax, which comprises adding thereto up to 10 per cent by weight thereof of oxidation-bleached Montan wax.

8. The process of hardening paraffin wax, which comprises adding thereto from 2 to 4 per cent by weight thereof of oxidation-bleached Montan wax.

In testimony whereof we have hereunto set our hands.

WILHELM PUNGS.
MICHAEL JAHRSTORFER.